US006936091B2

(12) United States Patent
Bayreuther

(10) Patent No.: US 6,936,091 B2
(45) Date of Patent: Aug. 30, 2005

(54) SYSTEM AND METHOD FOR TREATING FLUID USING A MULTI-PORT VALVE ASSEMBLY

(75) Inventor: David Bayreuther, Griswold, CT (US)

(73) Assignee: Metso Automation USA, Inc., Shrewsbury, MA (US)

( * ) Notice: Subject to any disclaimer, the term of this patent is extended or adjusted under 35 U.S.C. 154(b) by 36 days.

(21) Appl. No.: 10/663,677

(22) Filed: Sep. 17, 2003

(65) Prior Publication Data

US 2005/0056149 A1 Mar. 17, 2005

(51) Int. Cl.[7] .............................................. B01D 53/047
(52) U.S. Cl. ............................ 95/100; 95/103; 95/105; 95/122; 96/124; 96/130; 96/144
(58) Field of Search ...................... 95/96–106, 117–122; 96/124, 125, 130, 133, 143, 144

(56) References Cited

U.S. PATENT DOCUMENTS

| 3,197,944 | A | * | 8/1965 | Westeren et al. .............. 96/115 |
|---|---|---|---|---|
| 3,487,608 | A | * | 1/1970 | Graff ............................ 95/123 |
| 4,469,494 | A | * | 9/1984 | van Weenen ................. 96/124 |
| 4,589,892 | A | * | 5/1986 | Leonard ....................... 96/115 |
| 4,925,464 | A | | 5/1990 | Rabenau et al. |
| 4,971,611 | A | * | 11/1990 | Noguchi ....................... 96/123 |
| 5,268,021 | A | * | 12/1993 | Hill et al. ...................... 95/98 |
| 5,301,439 | A | * | 4/1994 | Wang ........................... 96/125 |
| 5,366,541 | A | * | 11/1994 | Hill et al. ..................... 96/124 |
| 5,487,775 | A | * | 1/1996 | LaCava et al. ................. 95/98 |
| 5,584,322 | A | * | 12/1996 | Poschl et al. ........... 137/625.46 |
| 5,681,376 | A | * | 10/1997 | Wooten et al. ................ 96/124 |
| 5,779,771 | A | * | 7/1998 | Wooten et al. ................ 96/124 |
| 5,807,423 | A | | 9/1998 | Lemcoff et al. |
| 5,814,130 | A | | 9/1998 | Lemcoff et al. |
| 5,814,131 | A | | 9/1998 | Lemcoff et al. |
| 5,820,656 | A | * | 10/1998 | Lemcoff et al. ............... 95/96 |
| 5,827,358 | A | * | 10/1998 | Kulish et al. ................. 96/115 |
| 5,891,217 | A | * | 4/1999 | Lemcoff et al. ............... 95/96 |
| 6,457,485 | B2 | | 10/2002 | Hill et al. |

* cited by examiner

Primary Examiner—Robert H. Spitzer
(74) Attorney, Agent, or Firm—Oblon, Spivak, McClelland, Maier & Neustadt, P.C.

(57) ABSTRACT

A valve assembly for use in a gas purification system having a plurality of vessels each having a first port opening and a second port opening. The gas purification system includes a first valve element having a first aperture to selectively connect a first port opening of a vessel to an outlet of the first valve element. The gas purification system also includes a second valve element having a second aperture to selectively connect a second port opening of a vessel to an input of the second valve element. Also provided are a motor adapted to rotate continuously and a converting mechanism that converts continuous movement of the motor into intermittent movement. The first and second valve elements are intermittently moved by the motor and the converting mechanism such that the intermittent movement changes the vessel connected to the second aperture and the vessel connected to the first aperture.

30 Claims, 14 Drawing Sheets

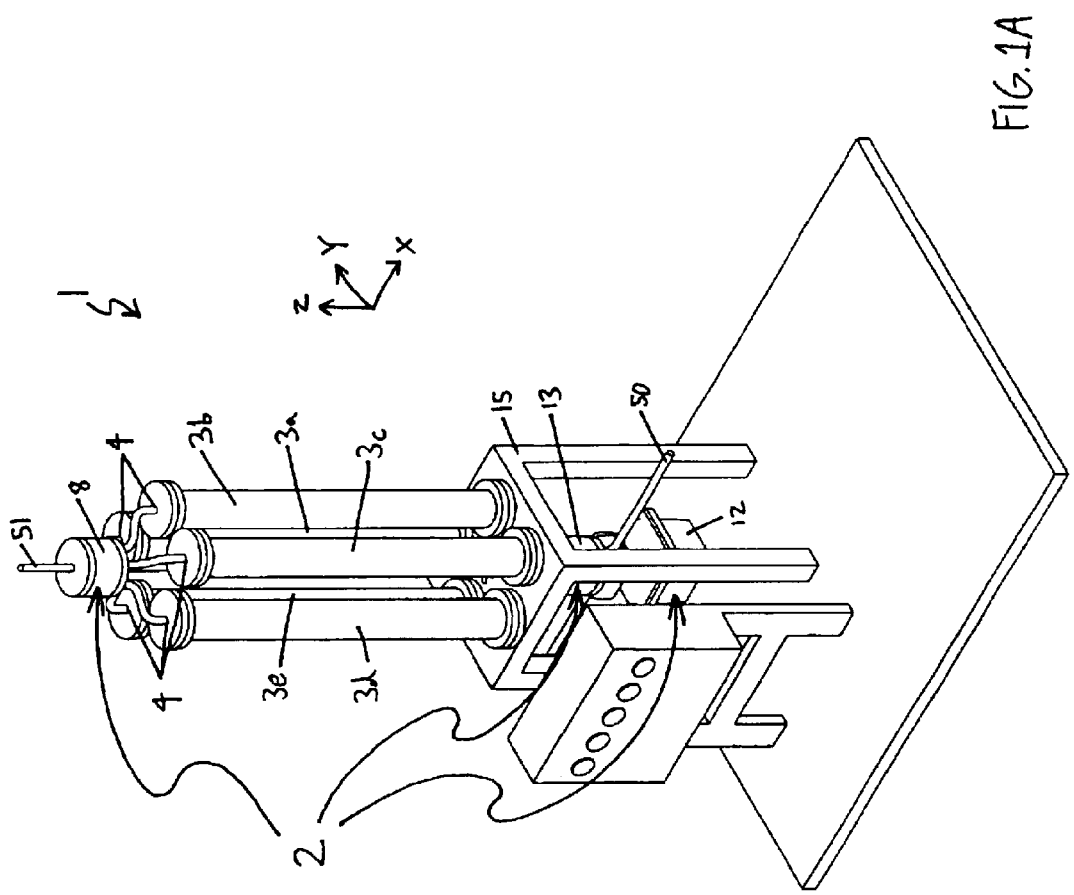

SYSTEM AND METHOD FOR TREATING FLUID USING A MULTI-PORT VALVE ASSEMBLY

FIELD OF THE INVENTION

The invention relates to fluid treatment systems and particularly to a multi-port valve assembly that can be provided in a fluid treatment system. The invention can be particularly advantageous for gas purification or gas separation, for example, to provide a hydrogen source.

BACKGROUND OF THE INVENTION

Discussion of Background

Fluid treatment systems typically require one or more valves or valving systems in order to control the fluid flow, turn the flow on and off, and/or change the flow paths between and among components in the fluid system. One fluid system that will become of increasing importance is a system for the separation or purification of hydrogen, so that pure or substantially pure hydrogen can be used as an alternative to conventional fuels such as gasoline. For example, environmental and preservationist concerns have resulted in the gradual rejection of fossil fuels as the primary energy source of the future. Consequently, different methods for implementing the widespread use of hydrogen fuel cells are currently being explored. As used herein, pure or substantially pure hydrogen is intended to mean that the hydrogen is of sufficient purity or the purity intended because, obviously, absolute or perfect purity is not practical.

In a conventional pressure swing adsorption (PSA) system, a five-step process is used to separate hydrogen from a hydrogen-rich feed gas. In the first "adsorption" step, feed gas is passed through a first vessel including adsorbent material, where impurities are selectively adsorbed. Pure hydrogen product exits the vessel at high pressure, and the first vessel, now saturated with impurities, must be regenerated. In the second "co-current depressurization" step, hydrogen trapped in void spaces of the first vessel is directed into another vessel by depressurizing the first vessel in a co-current direction (i.e., in the direction in which the feed gas was originally introduced in the first vessel). In the third "counter-current depressurization" step, depressurization is performed in the first vessel in a counter-current direction (i.e., opposite to the co-current direction), and impurities are transferred to a tail stream. In the fourth "purge" step, the first vessel is cleaned at low pressure using a hydrogen-rich stream obtained from another vessel during co-current depressurization, thereby further transferring impurities into the tail stream. In the fifth "counter-current repressurization" step, the first vessel is repressurized with pure hydrogen product from two other vessels, one vessel undergoing the co-current depressurization step and the other undergoing the adsorption step. As should be apparent, to operate this process, the flow paths or flow relationships are repeatedly changed. If this process is to be implemented on a commercial basis, the provision of a flow system or valving arrangement to repeatedly change the flow relationships in a reliable manner over extended periods of time presents a challenge that existing valve systems do not satisfactorily meet.

FIG. 9 illustrates an example of a gas processing system 52 that can be used for the PSA process described above. The system 52 is linearly-arranged and includes five vessels 53, each of which exclusively undergoes one of the five PSA steps at any given time during operation. Each vessel 53 receives feed fluid via a conduit 54, and each vessel 53 processes the feed fluid to produce a tail (or waste) fluid that is transferred through conduit 55 and a product fluid (the hydrogen fuel product) that is transferred through conduit 56. The vessels 53 are configured to communicate with each other via a conduit 62. Four valves 57 (which could be, e.g., ball valves or butterfly valves) are attached to each vessel 53 to control fluid flow into and out of conduits 54–56. Each valve 57 is controlled by a pneumatic actuator 58, which is in turn powered and controlled by power lines 59 and instrument air pipes 60. In order to properly sequence the gas processing system 52, a complex computer algorithm must be used to control the opening and closing of valves 57.

It is apparent that the processing system 52 requires many components and, consequently, is cumbersome, complex and expensive to build and operate, making such a system 52 undesirable for use in processing fluids, e.g., to obtain hydrogen, in an efficient manner.

Several multi-port systems have been proposed, including the systems described in U.S. Pat. Nos. 4,925,464; 5,814,130; 5,814,131; 5,807,423; and 6,457,485, the disclosures of which are hereby incorporated by reference in their entireties. However, each of these disclosed systems utilize components with complex geometries, which can require expensive manufacturing processes and result in unreliable operation. Accordingly, such designs also are less than optimal, particularly for use in hydrogen purification.

One factor that contributes to the design complexities is that the multi-port valves of these systems are in continuous rotation, requiring large and/or complex apertured plates to control the communication relationships or flow paths for desired time intervals. Because the apertured plates rotate continuously and must maintain a sealed relationship to prevent leakage, the arrangements constantly battle large forces required to maintain a sealed relationship of the relatively large components and the associated torque required to rotate the assembly components.

SUMMARY OF THE INVENTION

Accordingly, the present invention advantageously provides a novel multi-port valve system for treating fluid in a manner that is reliable, cost-efficient, and inexpensive as compared to systems as described above.

In accordance with a first aspect of the present invention, a valve assembly for a gas purification system is provided, where the gas purification system includes a plurality of vessels, each having a first port opening and a second port opening. According to a preferred exemplary form, the valve assembly includes a motor adapted to rotate continuously and a converting mechanism that converts continuous movement of the motor into intermittent movement. A first valve element is also provided and includes a first aperture to selectively connect a first port opening of one of the plurality of vessels to an outlet of the first valve element. The first valve element further includes a first passageway for selectively interconnecting the first port openings of a pair of the plurality of vessels. During operation of the gas purification system, the first valve element is intermittently moved by the motor and the converting mechanism such that each intermittent movement changes the vessel connected to the first aperture and changes the pair of vessels connected by the first passageway. The gas purification system also includes a second valve element having a second aperture to selectively connect a second port opening of one of the plurality of vessels to an input of the second valve element. The second valve element is also intermittently moved by the motor and the converting mechanism such that each intermittent movement changes the vessel connected to the second aperture.

In accordance with another aspect of the present invention, a valve element or assembly is provided. The valve assembly includes a first disc including two holes and a second disc positioned adjacent to the first disc. The second disc includes two apertures arranged to align with the two holes, and a first passageway arranged to allow fluid communication between the two apertures. The valve assembly also includes a driving unit arranged to rotate the second disc relative to the first disc in an intermittent manner such that a positional relationship between the two holes and the two apertures is changed.

In accordance with a further aspect of the present invention, a fluid treatment system is provided. The fluid treatment system includes a plurality of vessels each having a first port opening and a second port opening. A first valve element is also provided and includes a first aperture to selectively connect a first port opening of one of the plurality of vessels to an outlet of the first valve element. The fluid treatment system also includes a second valve element having a second aperture to selectively connect a second port opening of one of the plurality of vessels to an input of the second valve element. The fluid treatment system further includes a motor that is adapted to rotate continuously, and a converting mechanism that is configured to convert continuous movement of the motor into intermittent movement. The first and second valve elements are intermittently moved by the motor and the converting mechanism such that the intermittent movement changes the vessel connected to the second aperture and the vessel connected to the first aperture.

In accordance with a further aspect of the present invention, a valve assembly for a gas purification system is provided, in which the gas purification system includes a plurality of vessels each having a first port opening and a second port opening. The valve assembly includes a first valve element having first through fifth apertures arranged in a circular manner on a first surface of the first valve element. The first aperture is arranged to selectively connect a first port opening of one of the plurality of vessels to an outlet of the first valve element, where the outlet is positioned on a second surface of the first valve element. The fourth aperture is connected to the second aperture by a first passageway, and the fifth aperture is connected to the first aperture by a second passageway and to the second aperture by a third passageway. The valve assembly further includes a second valve element having sixth through eighth apertures on a first surface of the second valve. The sixth aperture is arranged to selectively connect a second port opening of the one of the plurality of vessels to an input of the second valve element, where the input is positioned on a second surface of the second valve element. The seventh and eighth apertures are arranged to selectively and respectively connect second ports of two of the plurality of vessels to two outlets positioned on a third surface of the second valve element.

In accordance with a further aspect, a method of handling a fluid in a gas purification system is provided. In accordance with the preferred method, a plurality of vessels are provided and selectively connected to apertures of a first valve element. The first valve element is initially positioned in a first position to remove a product fluid from a first port opening of a first one of the plurality of vessels. The first valve element is then intermittently rotated, so that it can be moved to a second position to depressurize the first vessel. This depressurization can occur by fluid flow in a first direction. The next intermittent movement of the first valve element moves the first valve element to a third position to depressurize the first vessel in a second direction opposite to the first direction. The first valve element is then moved, again by intermittent rotation, to a fourth position to purge impurities from the first vessel. Then, the first valve element is moved, once again by intermittent rotation, to a fifth position to repressurize the first vessel.

Although, as discussed earlier, the invention can be particularly advantageous for use in purification of hydrogen, it is to be understood that the invention could be advantageously utilized for other applications.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are perspective and side views of a fluid treatment system in accordance with an exemplary embodiment of the present invention.

DETAILED DESCRIPTION OF THE PREFERRED EMBODIMENT

Figure 1B:
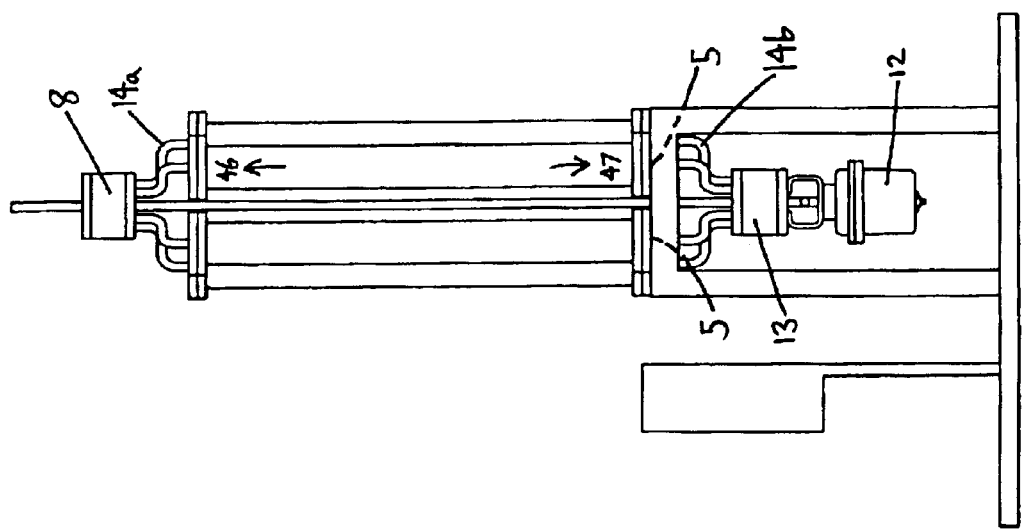

Referring now to the drawings, where like reference numeral designations identify the same or corresponding parts throughout the several views, several embodiments of the present invention are next described.

FIGS. 1A and 1B illustrate a fluid treatment system 1, which can be used in a variety of fluid treatment applications. For example, the fluid treatment system 1 can be used to treat fluids in gas form (e.g., air or natural gas) or in liquid form, depending on the functions of vessels 3a–3e included in the fluid treatment system 1. For example, each one of the vessels 3a–3e in the fluid treatment system 1 can include adsorption material adapted for hydrogen purification. Moreover, the fluid treatment system 1 can be used in a wide range of temperature and pressure operating conditions.

Figure 2:
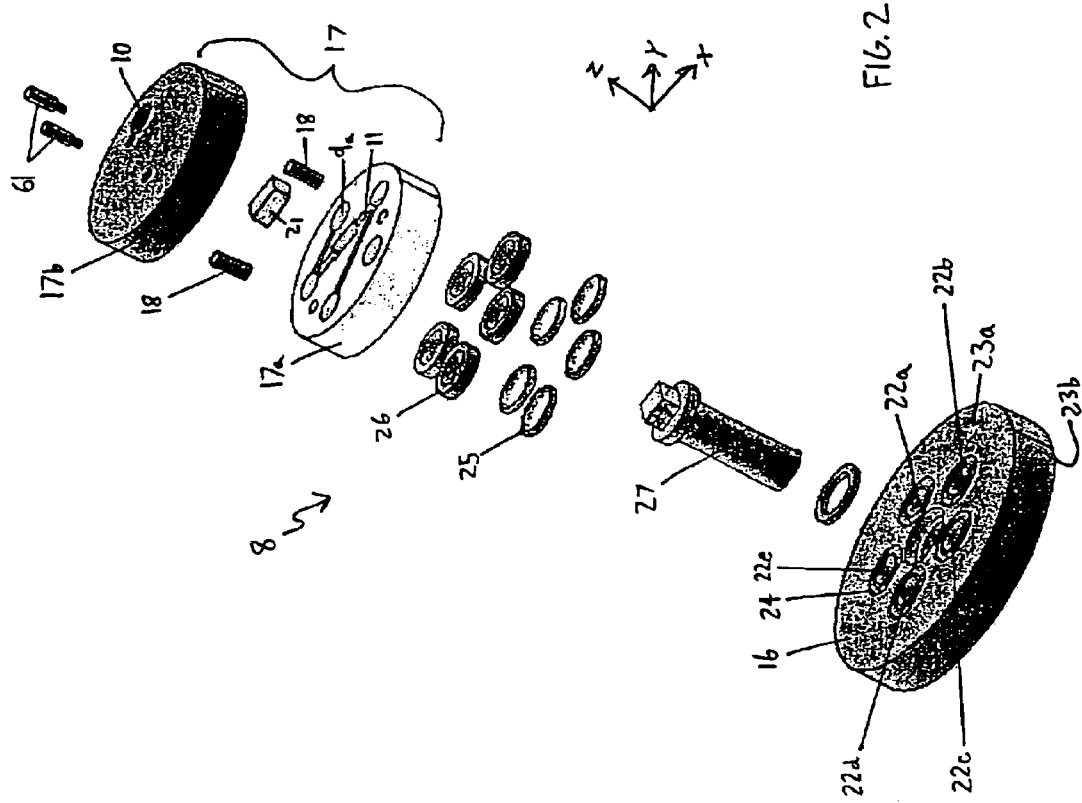
FIG. 2 is an exploded view of the first valve element of the fluid treatment system shown in FIGS. 1A and 1B.

The fluid treatment system 1 includes the vessels 3a–3e and a valve assembly 2. The valve assembly 2 includes a first valve element 8, a second valve element 13, and a driving unit 12. The first valve element 8 can be made of metal, polymer, or any other formable material that exhibits the necessary properties for handling fluid to be treated. The first valve element 8 is preferably cylindrical in shape and can be scaled up or down to accommodate a wide variety of configurations. The first valve element 8 includes a first disc 16 and a second disc 17. The second disc 17 is shown as two separate portions: a first portion 17a and a second portion 17b. The second disc 17 can be constructed such that the first portion 17a and the second portion 17b are separately-manufactured components fixedly attached by pins 18 (as shown in FIG. 2) or, alternatively, fasteners, adhesive bonding, brazing, soldering, welding, or any other means of attaching suitable for use in a fluid treatment system. When the first and second portions 17a and 17b are separately-manufactured components, they are attached in a substantially gas-tight manner. For purposes of this document, "substantially gas-tight" refers to a condition where either no amount or only a minimal amount of fluid is allowed to escape, as is known in the art. Alternatively, the first and second portions 17a and 17b can be formed as a unitary component such that the first and second portions 17a and 17b are cast, molded, machined, or otherwise formed as a single component from a formable material.

Figure 3A:
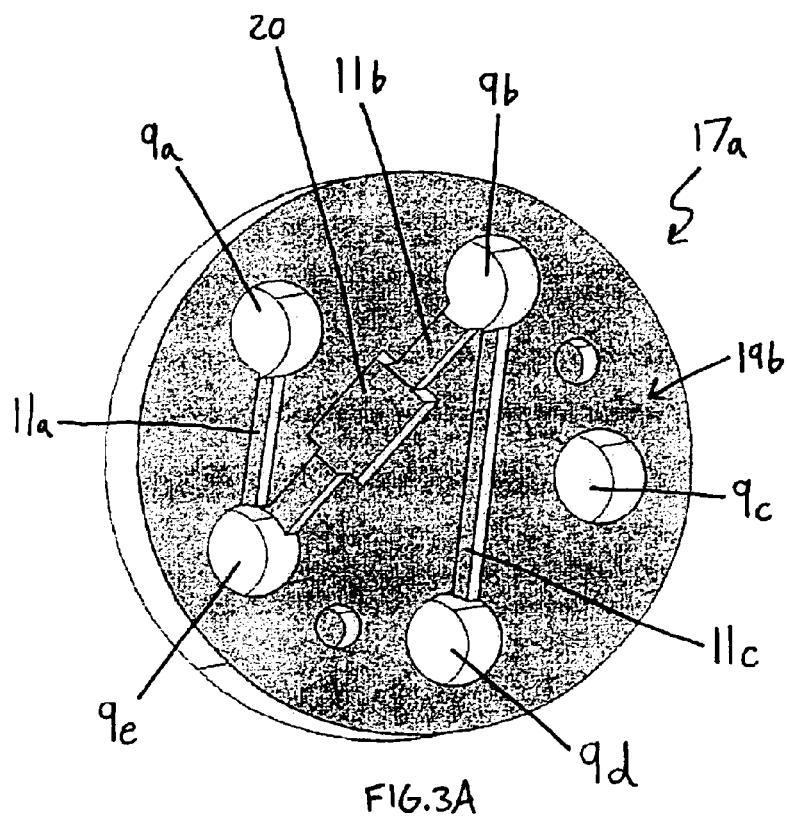
FIGS. 3A and 3B are perspective views of a first portion of the second disc of the first valve element shown in FIG. 2.
Figure 3B:
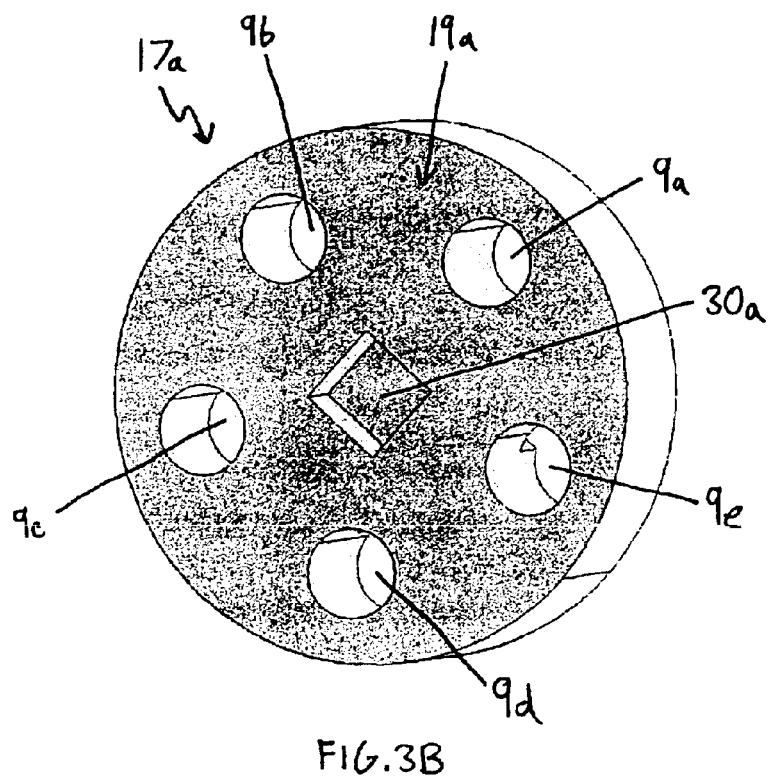

As shown in FIG. 3B, the apertures 9a–9e are positioned on a first surface 19a of the first portion 17a and extend through to the second surface 19b. All referenced apertures in this document can be made during a forming process or in a post-forming operation. While the first portion 17a is shown to include five apertures 9a–9e, this quantity can alternatively be more or less depending on the fluid process involved. Three passageways 11a–11c are positioned on the second surface 19b and provide for fluid communication between the connected apertures. The passageway 11a connects the apertures 9a and 9e; the passageway 11b connects the apertures 9b and 9e; and the passageway 11c connects the apertures 9b and 9d. Of course, the quantity and configuration of the passageways can alternatively be varied depending on the fluid process involved. Also, the passageways 11a–11c can be formed during formation of the first portion 17a (e.g., in a casting process) or in a post-forming machining process, and the passageways 11a–11c can have any profile suitable for fluid transport. A recess 20 for accommodating a flow control member 21 (e.g., a ball-spring check valve), also included in the valve assembly 2, is provided on second surface to control a fluid flow within the passageway 11b.

As shown in FIG. 2, the second portion 17b includes an outlet 10 that is aligned with the aperture 9a. Due to the substantially gas-tight seal between the first and second portions 17a and 17b, the aperture 9a and the outlet 10 essentially perform as a single fluid conduit.

The first disc 16 includes five holes 22a–22e which extend from a first surface 23a to a second surface 23b, and is fixedly mounted to a frame 15 (FIGS. 1A and 1B). The quantity of the holes 22a–22e can differ from the embodiment shown in FIG. 2, but are preferably equal to the number of the apertures 9a–9e in the second disc 17. Also, the holes 22a–22e are arranged such that each hole is aligned with one of the apertures 9a–9e when the first valve element 8 is in one of its predetermined positions, as shown in FIGS. 8A–8E. On the first surface 23a, the first disc 16 includes a circular recess 24 positioned around each of the holes 22a–22e. Each of the recesses 24 is adapted to receive a sealing component 25 and a seating component 26. The sealing and seating components 25 and 26 are adapted to ensure substantially gas-tight sealing between the first and second discs 16 and 17 at all times during operation of the valve assembly 2.

Additionally, the seating components 26 are adapted to ensure that the first and second discs 16 and 17 can be easily moved relative to one another (e.g., in an intermittent rotation produced by the driving unit 12). For example, the seating components 26 can be formed of a low-friction material (e.g., plastic) or can be polished to an extent necessary to provide a low-friction surface, as is recognized in the art. Alternatively or additionally, the first surface 23a and the first surface 19a can be adapted (e.g., polished) such that the first and second discs 16 and 17 can be easily moved relative to one another.

A rod 27 is provided in the valve assembly 2 to connect the second disc 17 to the second disc 29 of the second valve element 13. The rod 27 can be made of metal, polymer, or any other formable material that exhibits the necessary properties for handling torque loads created by the driving unit 12. One end of the rod 27 is adapted to interface with a recess 30a of the second disc 17, and the other end of the rod 27 to a recess 30b of the second disc 29, such that rotation of the rod 27 results in rotation of both of the second discs 17 and 29.

Figure 4:
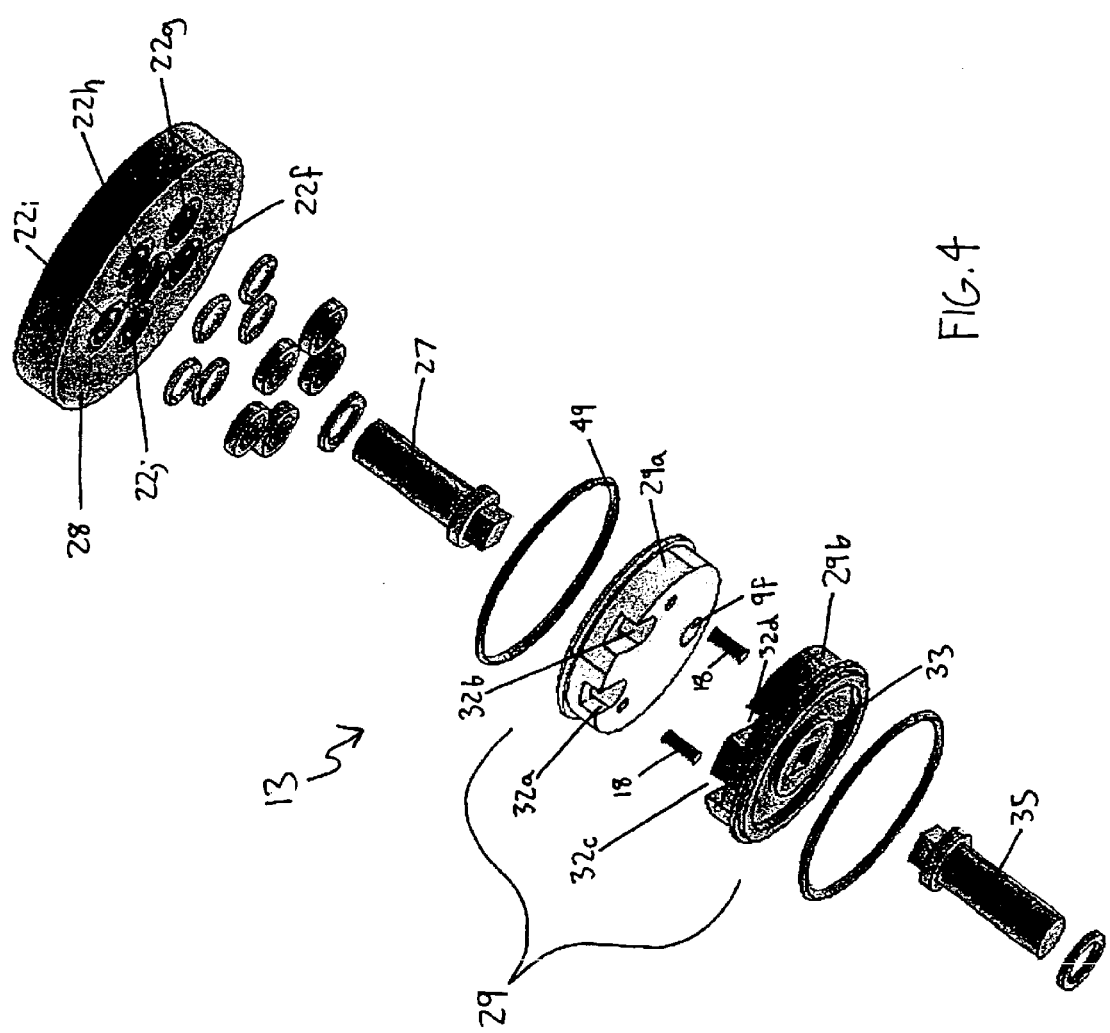
FIG. 4 is an exploded view of the second valve element of the fluid treatment system shown in FIGS. 1A and 1B.

The second valve element 13 is preferably cylindrical in shape and can be scaled up or down to accommodate a wide variety of configurations. The second valve element 13 includes a first disc 28 and a second disc 29. The second disc 29 is shown as two separate portions: a first portion 29a and a second portion 29b. The second disc 29 can be constructed such that the first portion 29a and the second portion 29b are separately-manufactured components fixedly attached by pins 18 (as shown in FIG. 4) or, alternatively, fasteners, adhesive bonding, brazing, soldering, welding, or any other means of attaching suitable for use in a fluid treatment system. When the first and second portions 29a and 29b are separately-manufactured components, they are attached in a substantially gas-tight manner. Alternatively, the first and second portions 29a and 29b can be formed as a unitary component such that the first and second portions 29a and 29b are cast, molded, machined, or otherwise formed as a single component from a formable material.

Figure 5A:
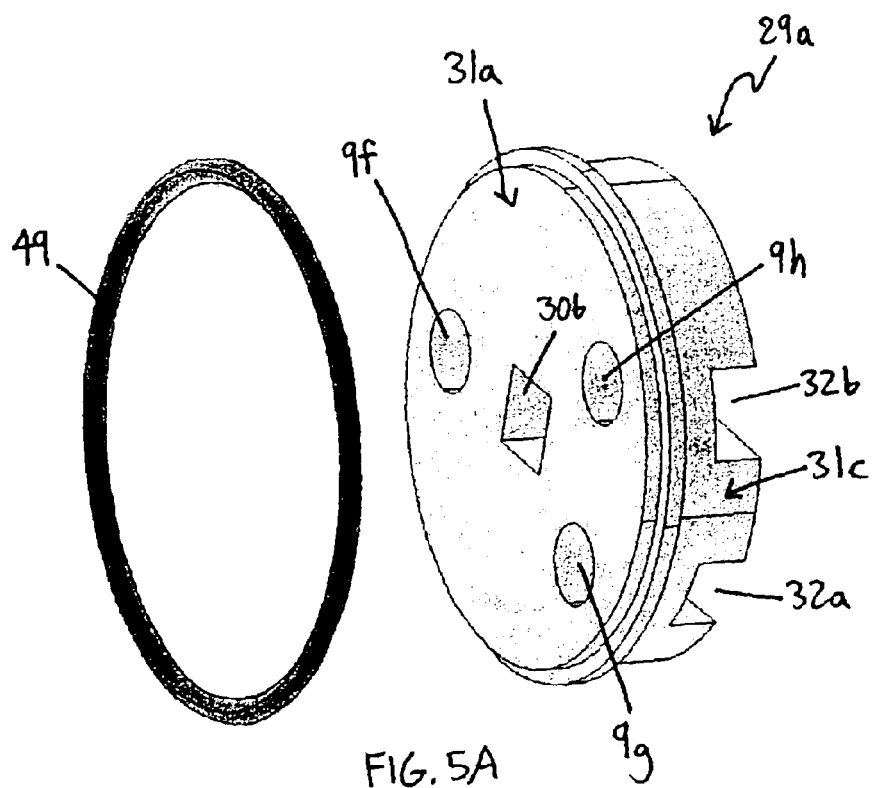
FIGS. 5A and 5B are perspective views of the first disc of the second valve element shown in FIG. 4.
Figure 5B:
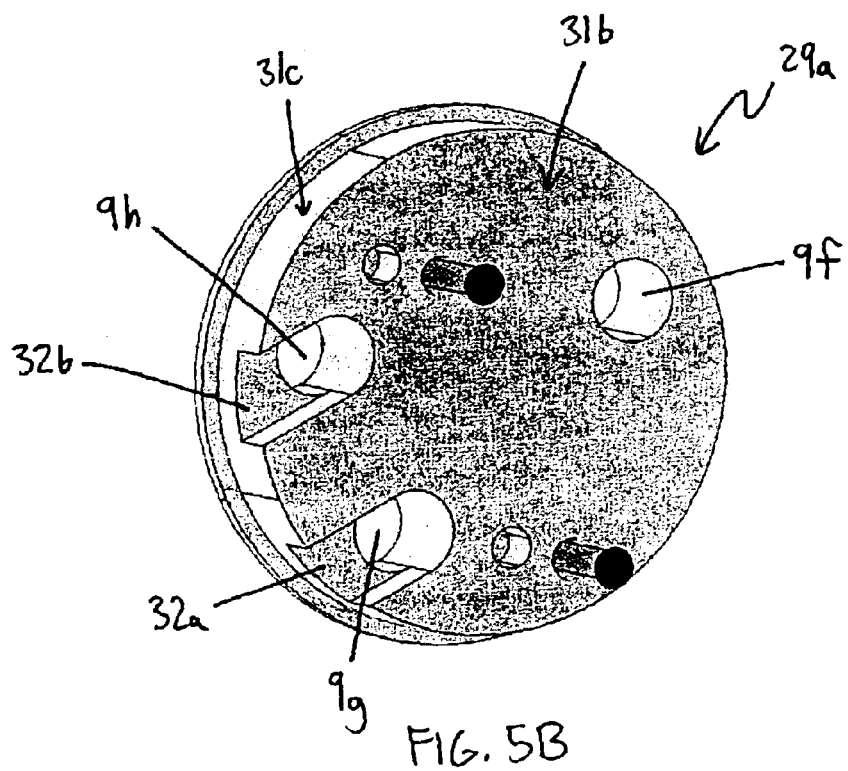

As shown in FIG. 5A, the apertures 9f–9h are positioned on a first surface 31a of the first portion 29a and extend through to the second surface 31b. While the first portion 29a is shown to include three apertures 9f–9h, this quantity can alternatively be more or less depending on the fluid process involved. Provided on the second surface 31b are two channels 32a and 32b, which respectively direct fluid flow from the apertures 9g and 9h out of the second valve element 13 through a third surface 31c. Of course, the quantity and configuration of the channels can alternatively be varied depending on the fluid process involved. Also, the channels 32a and 32b can be formed during formation of the first portion 29a (e.g., in a casting process) or in a post-forming machining process, and the channels 32a and 32b can have any profile suitable for fluid transport.

The first disc 28 is substantially similar to the first disc 16 in form and function, and is also fixedly mounted on the frame 15. The first disc 28 includes five holes 22f–22j, which are arranged such that three of the holes are aligned with the apertures 9f–9h when the second valve element 13 is in one of its predetermined positions (described below). Sealing and seating components 25 and 26 are adapted to function as described above with respect to the first valve element 8.

Figure 6A:
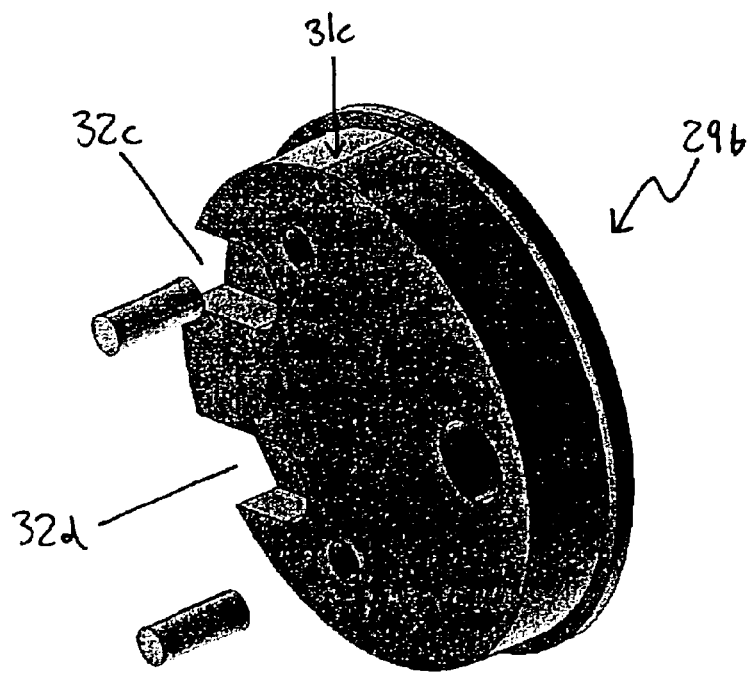
FIGS. 6A and 6B are perspective views of the second disc of the second valve element shown in FIG. 4.
Figure 6B:
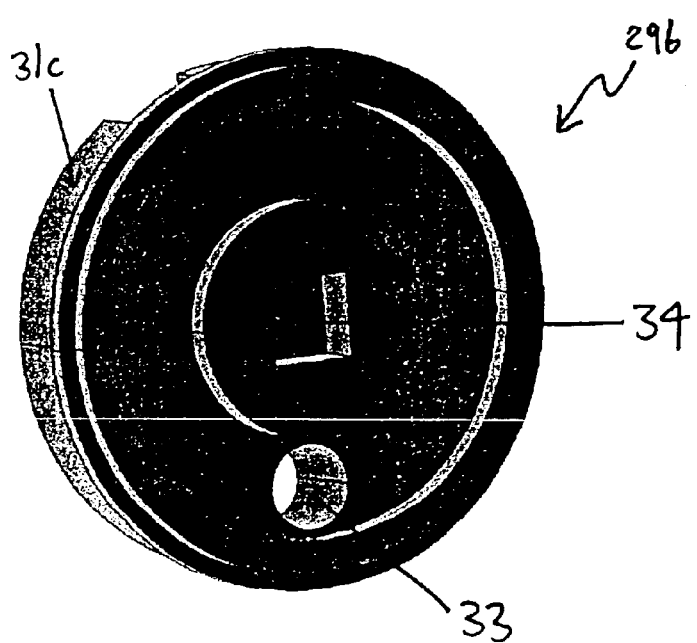

As shown in FIGS. 6A and 6B, the second portion 29b includes an inlet 33 that is aligned with the aperture 9f. Due to the substantially gas-tight seal between the first and second portions 29a and 29b, the aperture 9f and the inlet 33 essentially perform as a single fluid conduit. The second portion 29b also includes channels 32c and 32d, which are adapted to respectively align with channels 32a and 32b of the first portion 29a. In this way, the channels 32a-32d essentially perform as two fluid conduits that direct fluid from the apertures 9g and 9h out of the second valve element 13 through the third surface 31c.

The vessels 3a-3e are cylindrical in shape and have their longitudinal axes arranged substantially parallel to one another (e.g., along the z-axis in FIG. 1A). For purposes of this document, "substantially parallel" refers to a condition where components are within a permittable range of parallelism as is known in the art. Alternatively, the vessels 3a-3e can be any other shape and orientation known in the art which allows for the fluid handling method described below. Also, the vessels 3a-3e can be manufactured from any material and in any manner suitable for a desired fluid treatment operation, as are known in the art.

The vessels 3a-3e can include a variety of fluid treatment materials, depending on the desired process. For example, the vessels 3a-3e can be used for treating air, natural gas, or any other fluids known in the art using adsorbent material. Adsorbent or absorbent beds may employ a variety of known materials that, singly or in combination, selectively remove contaminants from the fluid stream. Exemplary contaminant/adsorbent systems are hydrocarbon vapors on activated carbon, hydrogen sulfide on metal and metal oxide doped activated carbon, mercaptans and other sulfur-bearing organics on either of the above adsorbents or zeolites, and water on silica gel. In an exemplary embodiment, the vessels 3a-3e can each include adsorbent materials adapted to perform a hydrogen purification in a PSA process.

Each one of the vessels 3a-3e includes a first port opening 4 and a second port opening 5, where each of the first and second port openings 4 and 5 can be used as an inlet or outlet port. Each of the first port openings 4 is attached to one of the holes 22a-22e in the first disc 16 by conduits 14a. Each second port opening 5 is attached to one of holes 22f-22j in first disc 28 by conduits 14b. The conduits 14a and 14b provide for fluid communication between the vessels 3a-3e and the first discs 16 and 28, and can be arranged as elbowed pipes as shown in FIGS. 1A and 1B, or can be arranged as any other means for transporting fluid, as is known in the art. Also, the conduits 14a and 14b can be made of plastic, metal, or any other formable material suitable for a desired fluid treatment process. The first and second port openings 4 and 5, and the first discs 16 and 28, can be respectively attached to the conduits 14a and 14b by any substantially gas-tight connecting means known in the art, such as threaded components with sealing gel, for example.

Figure 7:
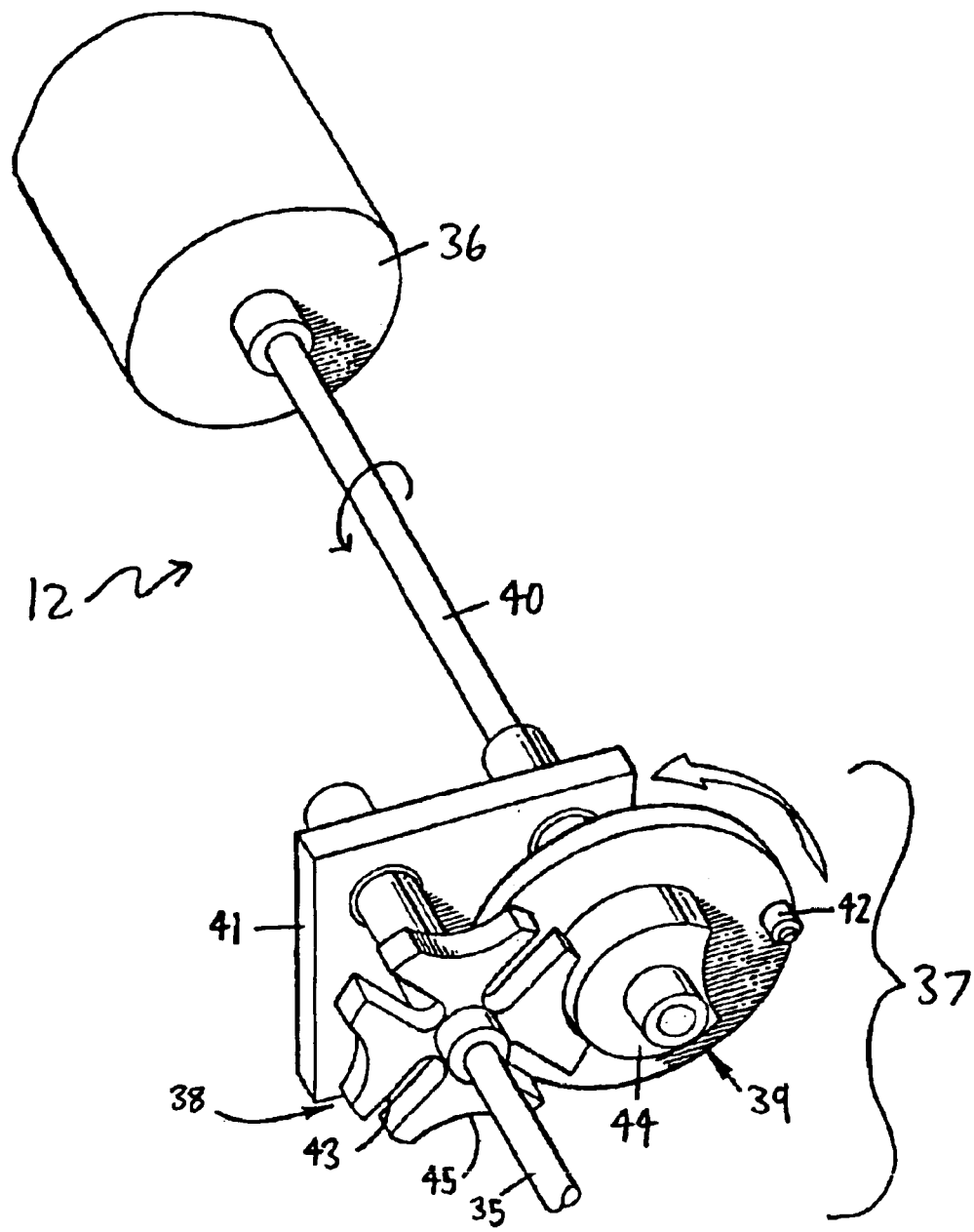
FIG. 7 is a perspective view of elements of the driving unit of the fluid treatment system shown in FIGS. 1A and 1B.

Referring to FIGS. 1A and 1B, the driving unit 12 is fixedly mounted to the frame 15 and is adapted to intermittently rotate the rod 35, to which it is attached. FIG. 7 illustrates internal elements of the driving unit 12, which includes a motor 36 and a converting mechanism 37. The motor 36, which can be an electric motor as is known in the art, is arranged to produce continuous rotation of the shaft 40.

The converting mechanism 37 is adapted to convert the continuous movement of motor 36 into intermittent movement, and includes a wheel 38 and a crank 39, a combination that is conventionally-known as a Geneva gear mechanism. The wheel 38 is shown to include four slots 43, but this quantity can be less or more, depending on the arrangement of the other components of the valve assembly 2 and the desired intermittent motion. For example, the wheel 38 can include five slots corresponding to the five holes of each of the first discs 16 and 28. Also, the crank 39 is shown to include a single pin 42, but can alternatively include more pins, depending on the desired intermittent motion. The shaft 40 is supported by a bracket 41 and, by the driving of the motor 36, continuously rotates the crank 39 to which it is fixedly attached. As the crank 39 rotates, the pin 42 alternately interfaces with the slots 43 such that for each rotation of the crank 39, the wheel 38 executes a quarter-turn. When the pin 42 is not engaged with any of the slots 43, a plate 44 on the crank 39 interfaces with one of the recesses 45 such that the wheel 38 does not rotate until the pin 42 engages one of the slots 43. In this way, continuous movement created by the motor 36 is converted into intermittent movement by the converting mechanism 37. As the rod 35 is fixedly attached to the wheel 38, intermittent rotational movement is transmitted to the second discs 29 and 17.

Alternatively to the non-limiting example shown in FIG. 7, the driving unit 12 can provide intermittent movement by any other means known in the art suitable for a desired fluid treatment process. For example, instead of using the elements shown in FIG. 7, the driving unit 12 can include a multi-bar linkage mechanism to convert continuous motion produced by a linear actuator into intermittent motion. Also, for example, the driving unit 12 can use a timed hydraulic or pneumatic actuator to directly create intermittent motion.

Using the valve assembly 2, relationships between the vessels 3a-3e and inlets and outlets of the valve assembly 2, and between the vessels 3a-3e themselves, can be selectively varied based on the positions of the first and second valve elements 8 and 13. For example, each of the first port openings 4 can be selectively connected to the outlet 10 via the aperture 9a or to another one of the first port openings 4 via one of the passageways 11a-11c, based on a position of the first valve element 8.

A method of handling fluid in accordance with an aspect of the present invention is now discussed with reference to FIGS. 8A-8E. As a non-limiting example, the method will be described with respect to a PSA process, as in known in the art. However, the valve assembly 2 can be used for any other fluid treatment process suitable for its configuration.

Figure 8A:
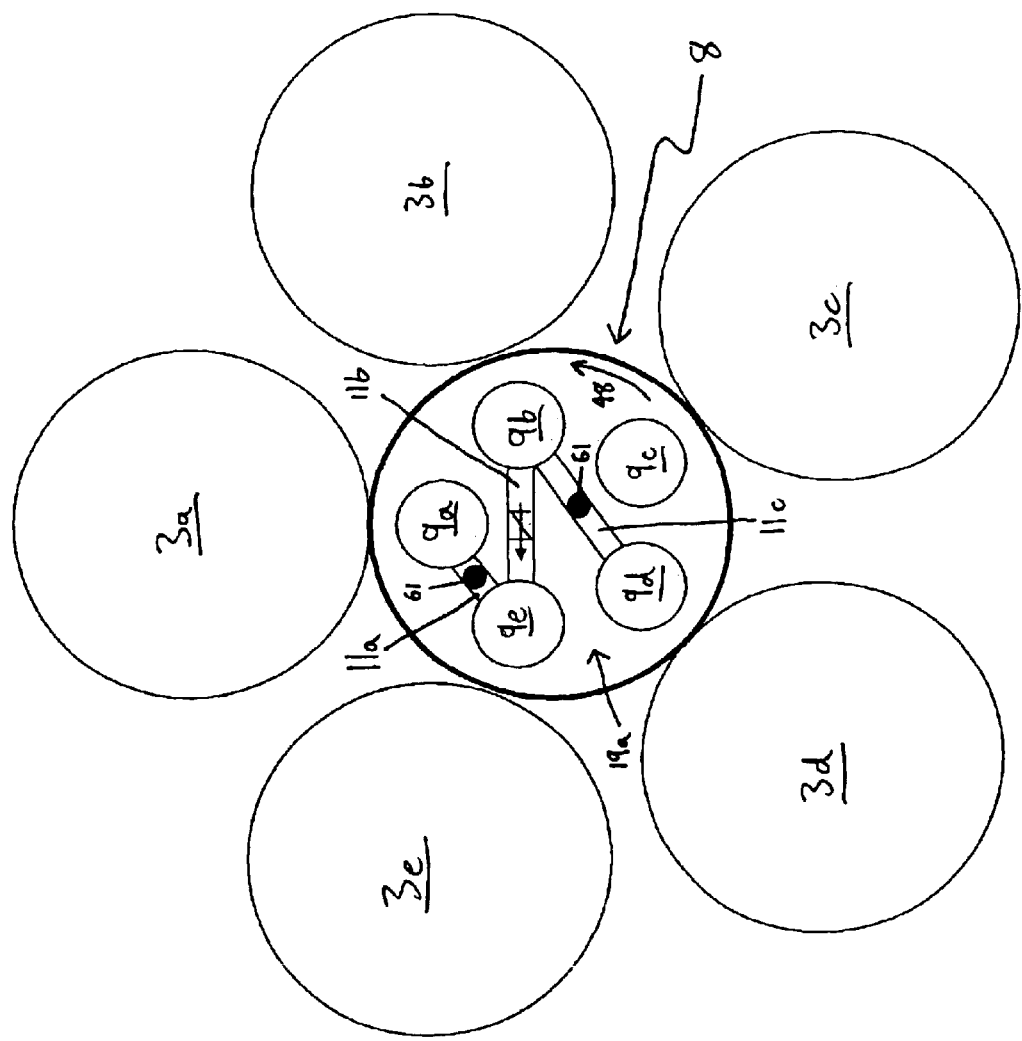
FIGS. 8A–8E are schematic views of different positions of the second disc and the vessels of the fluid treatment system shown in FIGS. 1A and 1B.

The first and second valve elements 8 and 13 are arranged to be selectively positioned in one of five positions (FIGS. 8A-8E), based on the intermittent driving of the driving unit 12. Specifically, the position of each valve element is changed by intermittently rotating the associated second disc relative to the corresponding first disc, which remains stationary throughout operation of the valve assembly 2. Each position is relative to a particular vessel and, more specifically, to a particular one of the first port openings 4 or of the second port openings 5. For example, as illustrated in FIG. 8A, the first valve element 8 is in: a first position with respect to the vessel 3a; a second position with respect to the vessel 3b; a third position with respect to the vessel 3c; a fourth position with respect to the vessel 3d; and a fifth position with respect to the vessel 3e. Referring to a PSA process, the first position corresponds to an adsorption step, the second position corresponds to a co-current depressurization step, the third position corresponds to a counter-current depressurization step, the fourth position corresponds to a purge step, and the fifth position corresponds to a repressurization step.

The method is provided with a step of positioning the first valve element 8 (represented in FIGS. 8A-8E by the first surface 19a of the first portion 17a) in a first position to remove a product fluid (e.g., pure hydrogen) from a first port opening 4 of the vessel 3a. In the first position, the aperture 9a is aligned with the hole 22a, which is connected to the first port opening 4 of the vessel 3a, and the inlet 33 is aligned with the hole 22f, which is connected to the second port opening 5 of the vessel 3a.

In the first position, feed fluid (e.g., air or natural gas) is introduced to the fluid treatment system 1 via the inlet 33 and is transferred to the vessel 3a via the second valve element 13. In this example, the vessels 3a–3e each include adsorbent material adapted for hydrogen purification, and impurities in feed fluid are adsorbed in the vessel 3a, creating a high-purity product fluid. The product fluid created in the first position exits the vessel 3a via two routes: the outlet 10 and the passageway 11a. Product fluid that enters the outlet 10 is transferred via a conduit 51 to a separate reservoir (e.g., a consumer-use reservoir for storing pure hydrogen). Product fluid entering the passageway 11a is directed to the aperture 9e and then to the vessel 3e, where it is used in a repressurization step (described below with respect to the fifth position). Flow of product fluid within the passageway 11a can be controlled by an adjusting component 61 (FIG. 2), which can be arranged as a screw-type member or any other means known in the art for controlling fluid flow rate. An adjusting component 61 is also provided in the passageway 11c.

Figure 8B:
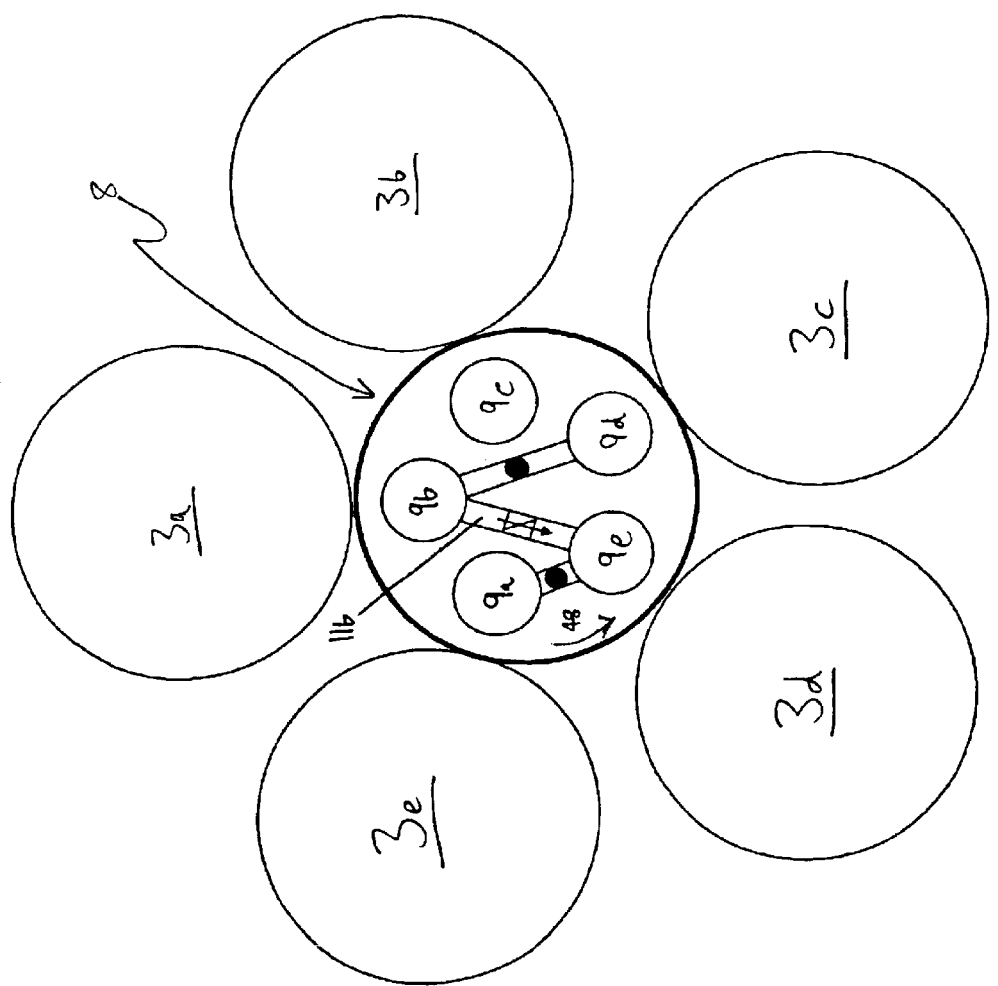

FIG. 8B illustrates the first valve element 8 in a second position with respect to the vessel 3a, which results from a step of moving the first valve element 8 by intermittent rotation to a second position to depressurize the vessel 3a in a first direction 46 (FIG. 1B), which is the direction towards the first port openings 4. In this step, the driving unit 12 moves first and second valve elements in an intermittent manner in the rotation direction 48 such that: the aperture 9b is aligned with the first port opening 4 of the vessel 3a, and the hole 22f is sealed in a substantially gas-tight manner by the first surface 31 and a sealing member 49 (e.g., arranged as an o-ring) such that fluid is unable to enter or exit the second port opening 5 of the vessel 3a.

In the second position, the vessel 3a is depressurized in the first direction 46 (FIG. 1B) such that product fluid trapped in a void space in the vessel 3a is withdrawn from the vessel 3a through the first port opening 4 of the vessel 3a. The withdrawn product fluid is directed through the passageway 11b to the aperture 9e and then to the vessel 3d, where it is used in a repressurization step (described below with respect to the fifth position).

Figure 8C:
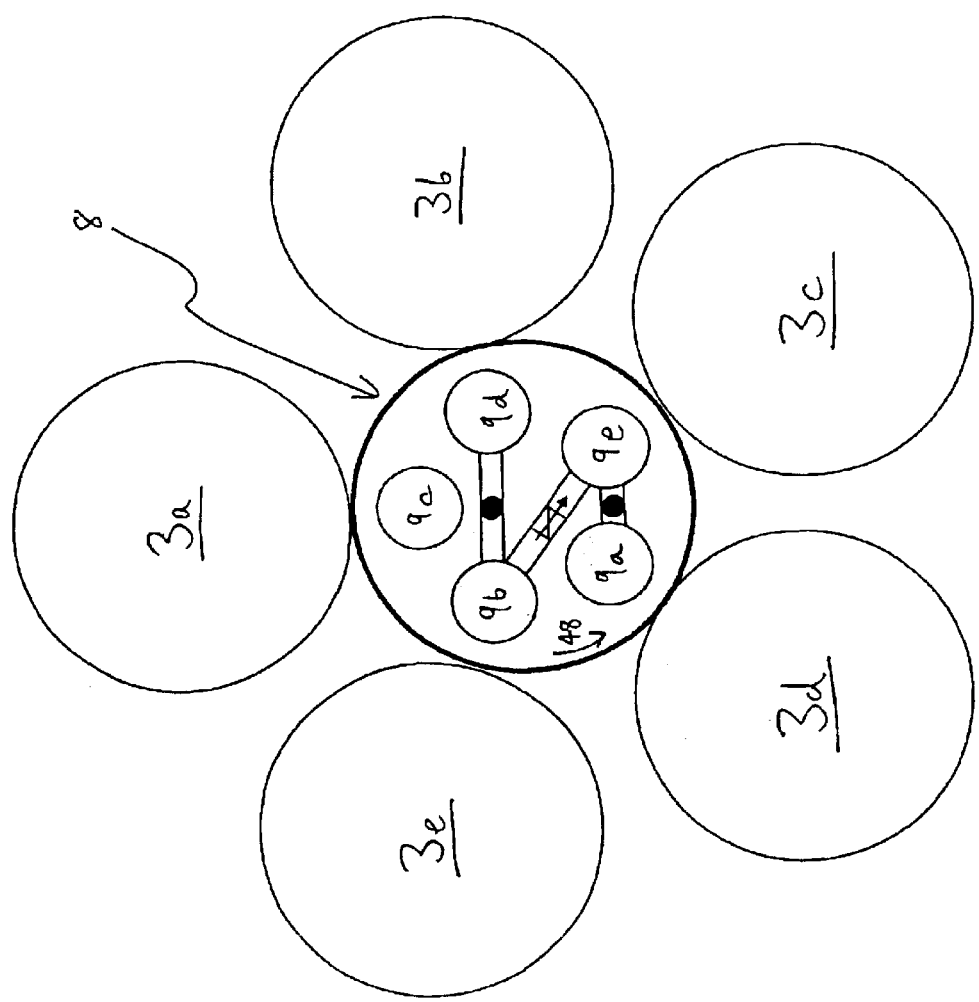

FIG. 8C illustrates the first valve element 8 in a third position with respect to the vessel 3a, which results from a step of moving the first valve element 8 by intermittent rotation to a third position to depressurize the vessel 3a in a second direction 47 (FIG. 1B), which is directly opposite to the first direction 46. In this step, the driving unit 12 moves first and second valve elements in an intermittent manner in the rotation direction 48 such that: the aperture 9c is aligned with the first port opening 4 of the vessel 3a, and the aperture 9h is aligned with the hole 22f, which is connected to the second port opening 5 of the vessel 3a (FIG. 4). In this way, fluid is prevented from entering or exiting through the first port opening 4 of the vessel 3a (i.e., the aperture 9c is not connected to any outlet or other aperture), but is allowed to exit through the second port opening 5 of the vessel 3a.

In the third position, the vessel 3a is depressurized along second direction 47 such that impurities adsorbed from the feed fluid are withdrawn from the vessel 3a as a tail fluid through the second port opening 5 of the vessel 3a. The tail fluid then passes through the aperture 9h and is directed by the channels 32b and 32d out of the third surface 31c of the second valve element 13. The tail fluid can then be transferred via a conduit 50 (FIG. 1A) to a reservoir positioned separately from the fluid treatment system 1.

Figure 8D:
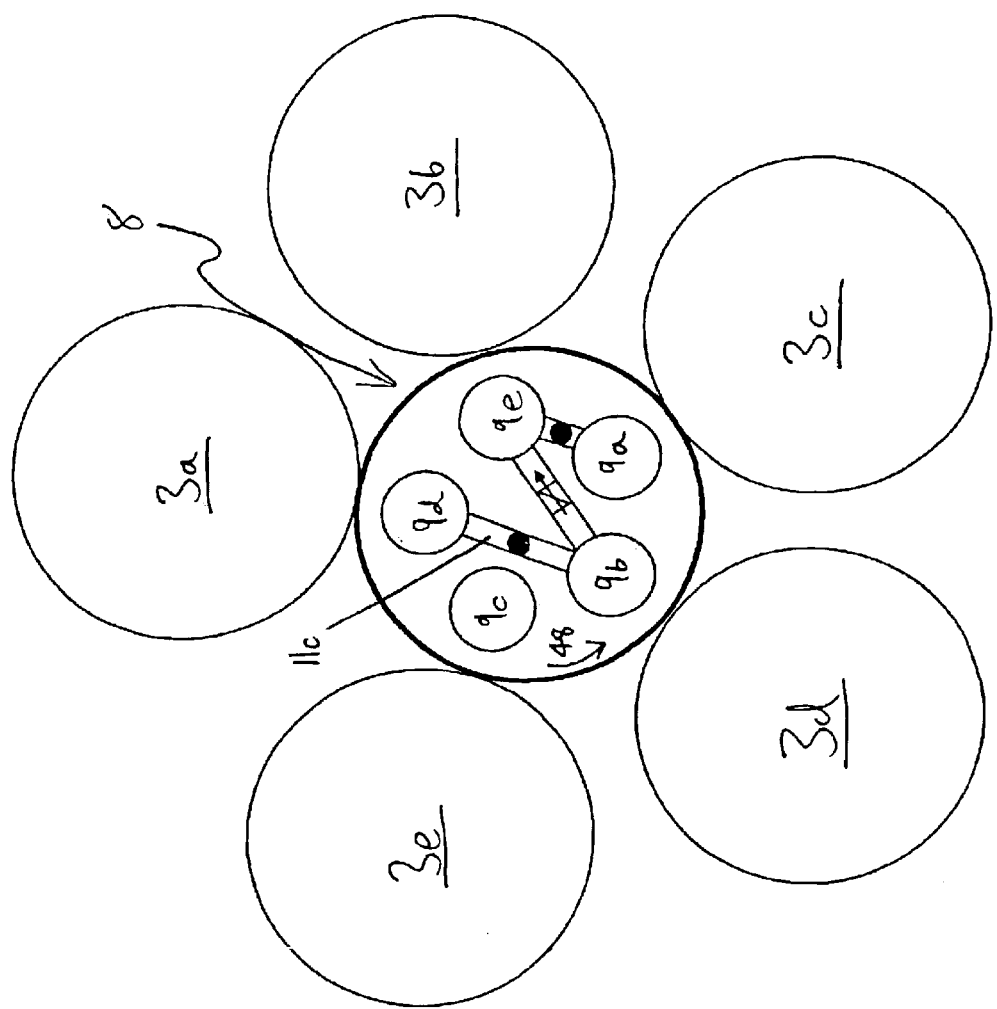

FIG. 8D illustrates the first valve element 8 in a fourth position with respect to the vessel 3a, which results from a step of moving the first valve element 8 by intermittent rotation to a fourth position to purge impurities from the vessel 3a. In this step, the driving unit 12 moves first and second valve elements in an intermittent manner in the rotation direction 48 such that: the aperture 9d is aligned with the first port opening 4 of the vessel 3a, and the aperture 9g is aligned with the hole 22f, which is connected to the second port opening 5 of the vessel 3a (FIG. 4). In this way, fluid is allowed to enter the vessel 3a through the first port opening 4 of the vessel 3a via the passageway 11c, and is allowed to exit through the second port opening 5 of the vessel 3a via the hole 22f and the aperture 9g.

In the fourth position, withdrawn product fluid from the vessel 3d is transferred through the aperture 9b and the passageway 11c, and directed into the aperture 9d at a constant pressure to purge remaining impurities from the vessel 3a. The impurities are transferred out of the second port opening 5 of the vessel 3a as a tail fluid, which then passes through the aperture 9g and is directed by the channels 32a and 32c out of the third surface 31c of the second valve element 13. The tail fluid can then be transferred via a conduit 50 (FIG. 1A) to a reservoir positioned separately from the fluid treatment system 1.

Figure 8E:
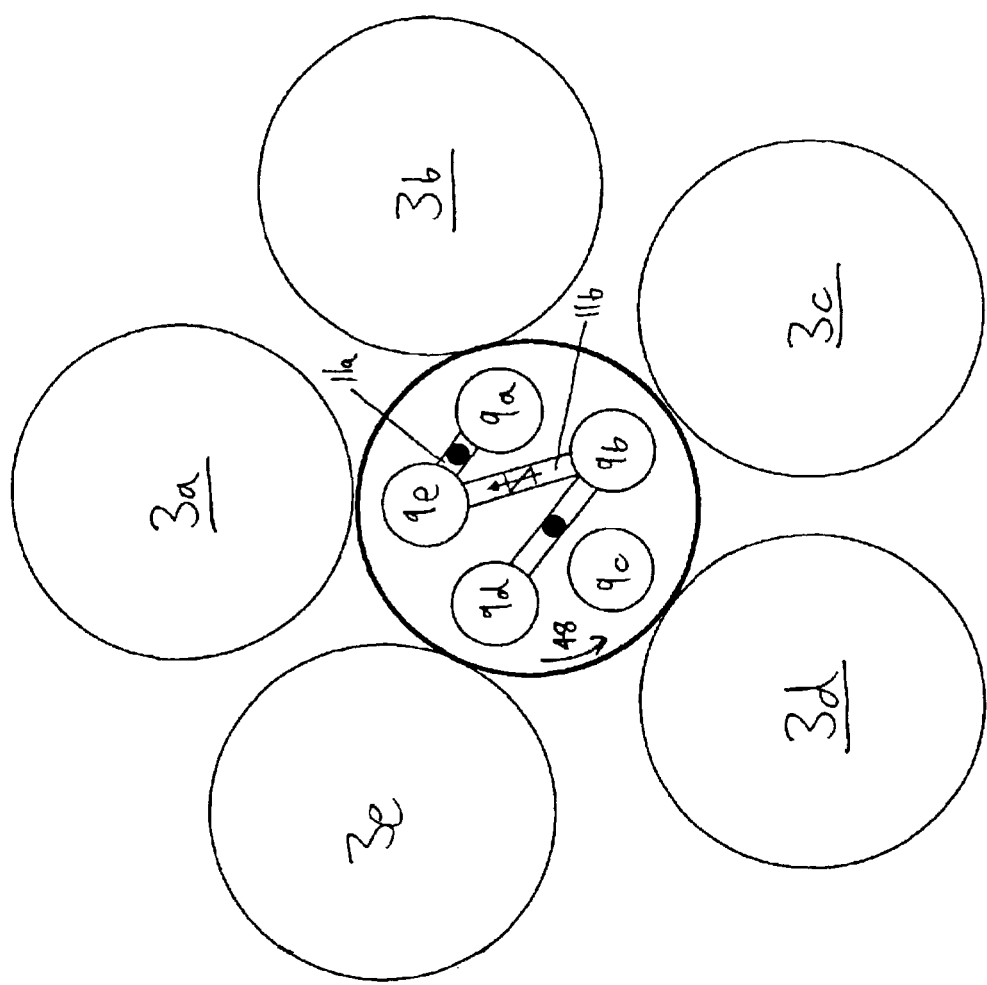

FIG. 8E illustrates the first valve element 8 in a fifth position with respect to the vessel 3a, which results from a step of moving the first valve element 8 by intermittent rotation to a fifth position to repressurize vessel 3a. In this step, the driving unit 12 moves first and second valve elements in an intermittent manner in the rotation direction 48 such that: the aperture 9e is aligned with the first port opening 4 of the vessel 3a, and the hole 22f is sealed in a substantially gas-tight manner by the first surface 31 and the sealing member 49 such that fluid is unable to enter or exit the second port opening 5 of the vessel 3a. In the fifth position, fluid is allowed to enter the vessel 3a through the first port opening 4 of the vessel 3a via the aperture 9e and the passageways 11a and 11b.

In the fifth position, the purged vessel 3a is repressurized with product fluid from the vessels 3b and 3c via the passageways 11a and 11b, respectively. Fluid flow within the passageway 11b is controlled by the flow control member 21, which can, for example, prevent fluid flow when the internal pressure in the vessel 3a is greater than the internal pressure in the vessel 3c.

After the vessel 3a is repressurized to a desired adsorption pressure, the driving unit 12 intermittently rotates first and second valve elements into the first position to begin the process anew. Because the fluid treatment system 1 includes five vessels in the illustrated example, five separate PSA processes can be currently performed in the fluid treatment system 1 at different stages.

Figure 9:
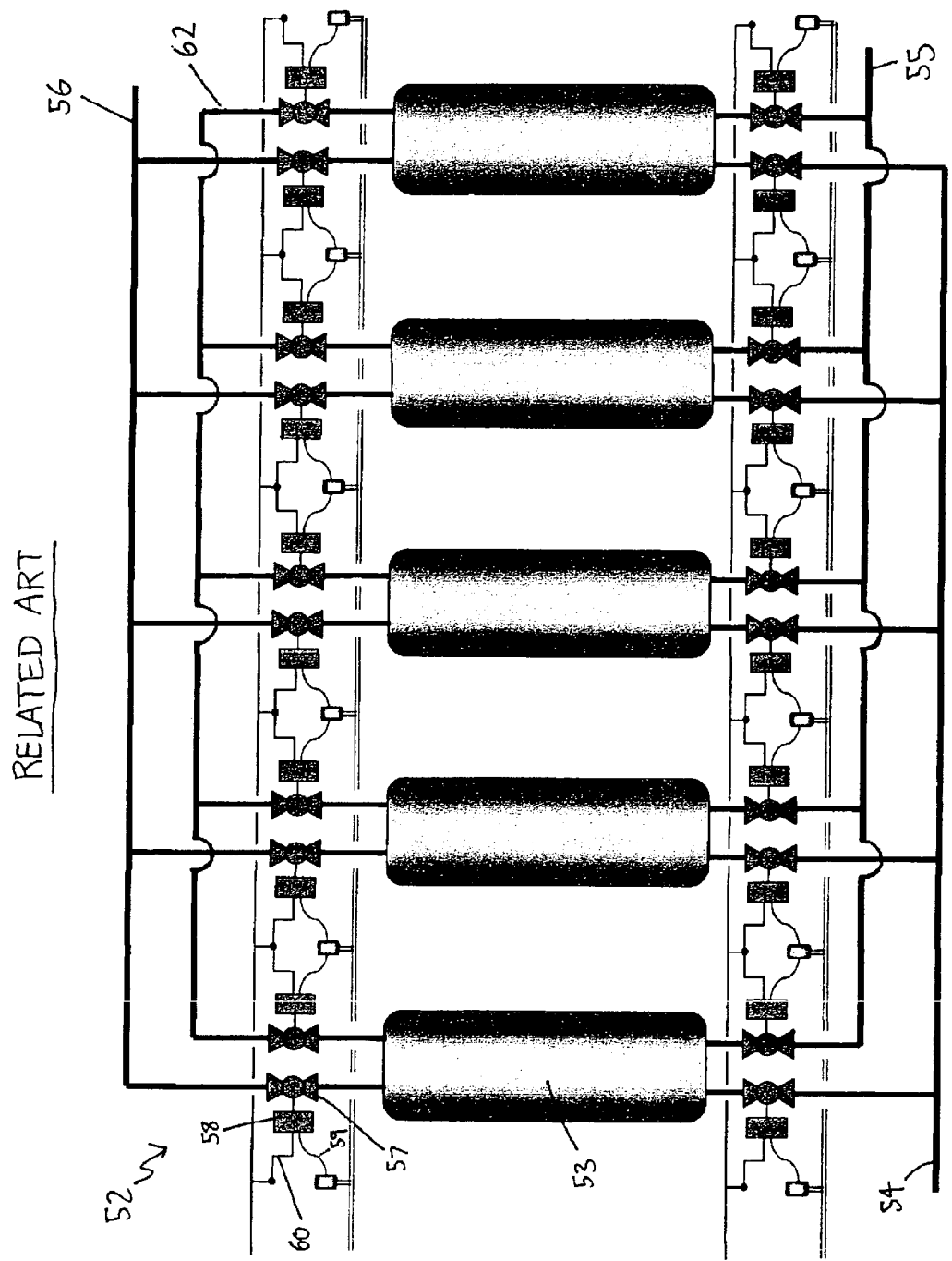
FIG. 9 is a schematic representation of a gas processing system using conventional valves.

By way of the above-described non-limiting examples, many deficiencies of known systems (e.g., the system shown in FIG. 9) are avoided. For example, because the fluid treatment system 1 uses a driving unit that produces intermittent motion, the geometry of the first valve element 8 can be relatively simple to allow cross-transferring of fluid between vessels (i.e., in the passageways). Use of intermittent motion also avoids the need for a complex control algorithm for sequencing the opening and closing of first and second port openings of the vessels. Also, the fluid treatment system 1 is much more compact than known systems, due to the rotational nature of the process, and also requires less components than known systems. For example, the present invention uses a single driving unit to concurrently perform multiple fluid treatment processes at different stages.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed as new and desired to be secured by Letters Patent of the United States is:

1. A method of handling a fluid in a gas purification system including a plurality of vessels selectively connected to apertures of a first valve element, comprising the steps of:
   (i) positioning said first valve element in a first position to remove a product fluid from a first port opening of a first one of said plurality of vessels;
   (ii) moving said first valve element by intermittent rotation to a second position to depressurize said first vessel in a first direction;
   (iii) moving said first valve element by intermittent rotation to a third position to depressurize said first vessel in a second direction, said second direction being directly opposite to said first direction;
   (iv) moving said first valve element by intermittent rotation to a fourth position to purge impurities from said first vessel; and
   (v) moving said first valve element by intermittent rotation to a fifth position to repressurize said first vessel.

2. The method of claim 1, said step (i) comprising the step of:
   removing impurities from a feed fluid to create said product fluid.

3. The method of claim 1, further comprising the step of:
   converting a continuous movement of a motor to an intermittent rotation for moving said first valve element to each of said second, third, fourth, and fifth positions.

4. The method of claim 1, said step (iv) comprising the step of:
   purging said impurities from said first vessel with a product fluid transferred from a second one of said plurality of vessels via a first passageway of said first valve element, said first valve element being positioned at said second position with respect to said second vessel.

5. The method of claim 4, said step (v) comprising the step of:
   repressurizing said first vessel with product fluids transferred from third and fourth ones of said plurality of vessels respectively via second and third passageways of said first valve element, said first valve element being positioned at said first position with respect to said third vessel and at said second position with respect to said fourth vessel.

6. The method of claim 5, said step (v) comprising the step of:
   controlling a flow of said product fluid within said third passageway with a check valve.

7. The method of claim 1, wherein step (i) comprises the step of:
   positioning a second valve element at said first position to provide said feed fluid to a second port opening of said first vessel.

8. The method of claim 7, wherein step (iii) comprises the step of:
   positioning said second valve element at said third position to remove an initial tail fluid from said second port opening of said first vessel.

9. The method of claim 8, wherein step (iv) comprises the step of:
   positioning said second valve element at said fourth position to remove a purged tail fluid from said second port opening of said first vessel.

10. A valve assembly for a gas purification system in which the gas purification system includes a plurality of vessels each having a first port opening and a second port opening, the valve assembly comprising:
    a motor adapted to rotate continuously;
    a converting mechanism that converts continuous movement of said motor into intermittent movement;
    a first valve element having a first aperture to selectively connect a first port opening of one of said plurality of vessels to an outlet of the first valve element, said first valve element further including a first passageway for selectively interconnecting first port openings of a pair of said plurality of vessels, wherein said first valve element is intermittently moved by said motor and said converting mechanism such that each intermittent movement changes the vessel connected to said first aperture and changes the pair of vessels connected by said first passageway; and
    a second valve element having a second aperture to selectively connect a second port opening of one of said plurality of vessels to an input of the second valve element, wherein said second valve element is intermittently moved by said motor and said converting mechanism such that each intermittent movement changes the vessel connected to said second aperture.

11. The valve assembly of claim 10, wherein said first aperture and said second aperture are concurrently connected to a first port opening and a second port opening, respectively, of a same one of said plurality of vessels.

12. The valve assembly of claim 10, further comprising:
    a flow control member arranged to control a fluid flow within said first passageway.

13. The valve assembly of claim 10, wherein said second valve element comprises:
    a third aperture to selectively connect a second port opening of another one of said plurality of vessels to an output of the second valve element, wherein each intermittent movement of said motor and said converting mechanism changes the vessel connected to said third aperture.

14. A valve element comprising:
    a first disc including two holes;
    a second disc positioned adjacent to said first disc, said second disc including,
      two apertures arranged to align with said two holes, and
      a first passageway arranged to allow fluid communication between said two apertures; and
    a driving unit arranged to rotate said second disc relative to said first disc in an intermittent manner such that a positional relationship between said two holes and said two apertures is changed.

15. The valve element of claim 14, further comprising:
a flow control member arranged to control a fluid flow within said first passageway.

16. The valve element of claim 14, wherein said driving unit is arranged to rotate said second disc in an intermittent manner such that one of said two apertures is rotated from one of said two holes to another one of said two holes.

17. The valve element of claim 14, wherein said driving unit comprises:
a motor arranged to produce continuous rotational movement; and
a converting mechanism arranged to translate said continuous rotational movement into an intermittent rotation.

18. The valve element of claim 14, wherein,
said first disc includes five holes including said two holes, and
said second disc includes five apertures including said two apertures, said five apertures including a first aperture, a second aperture, a third aperture, a fourth aperture, and a fifth aperture respectively arranged to align with said five holes.

19. The valve element of claim 18, wherein,
said first and fifth apertures are connected by a second passageway,
said second and fourth apertures are connected by a third passageway, and
said two apertures correspond to said second aperture and said fifth aperture.

20. The valve element of claim 19, further comprising:
adjusting components arranged to vary a fluid flow rate within said second and third passageways.

21. The valve element of claim 14, wherein,
said first disc is positioned between said driving unit and said second disc,
said first disc includes a center hole, and
said driving unit is rotatably connected to said second disc via a shaft positioned in said center hole.

22. The valve element of claim 14, further comprising:
sealing components positioned between said first and second discs, said sealing components being arranged to maintain a fluid seal between said first and second discs during an intermittent rotation between said first and second discs.

23. A fluid treatment system comprising:
a plurality of vessels each having a first port opening and a second port opening;
a first valve element having a first aperture to selectively connect a first port opening of one of said plurality of vessels to an outlet of the first valve element;
a second valve element having a second aperture to selectively connect a second port opening of one of said plurality of vessels to an input of the second valve element;
a motor adapted to rotate continuously; and
a converting mechanism that converts continuous movement of said motor into intermittent movement, wherein said first and second valve elements are intermittently moved by said motor and said converting mechanism such that the intermittent movement changes the vessel connected to said second aperture and the vessel connected to said first aperture.

24. The fluid treatment system of claim 5, wherein,
said first and second valve elements are connected by a rod, and
said plurality of vessels are positioned on different sides of said rod and between said first and second valve elements.

25. The fluid treatment system of claim 23, wherein at least one of the plurality of vessels includes adsorbent material.

26. The fluid treatment system of claim 23, wherein each of said first and second valve elements is cylindrically shaped.

27. A valve assembly for a gas purification system in which the gas purification system includes a plurality of vessels each having a first port opening and a second port opening, the valve assembly comprising:
a first valve element having first through fifth apertures arranged in a circular manner on a first surface of said first valve element, wherein,
said first aperture is arranged to selectively connect a first port opening of one of said plurality of vessels to an outlet of the first valve element, said outlet being positioned on a second surface of said first valve element,
said fourth aperture is connected to said second aperture by a first passageway, and
said fifth aperture is connected to said first aperture by a second passageway and to said second aperture by a third passageway;
a second valve element having sixth through eighth apertures on a first surface of said second valve, wherein,
said sixth aperture is arranged to selectively connect a second port opening of said one of said plurality of vessels to an input of the second valve element, said input being positioned on a second surface of said second valve element, and
said seventh and eighth apertures are arranged to selectively and respectively connect second ports of two of said plurality of vessels to two outlets positioned on a third surface of said second valve element.

28. The valve assembly of claim 27, wherein said first and second valve elements are rotatable relative to said plurality of vessels.

29. The valve assembly of claim 27, wherein
said first and second valve elements are connected by a rod, and
said plurality of vessels is arranged on different sides said rod.

30. The valve assembly of claim 27, further comprising:
a flow control member adapted to control a fluid flow within said third passageway.

* * * * *